UNITED STATES PATENT OFFICE.

WILHELM HERZBERG, OF WILMERSDORF, AND GERHARD HOPPE, OF TREPTOW, GERMANY, ASSIGNORS TO ACTIEN GESELLSCHAFT FÜR ANILIN FABRIKATION, OF BERLIN, GERMANY.

BLUE DYES OF THE ANTHRAQUINONE SERIES.

1,078,505.  Specification of Letters Patent.  Patented Nov. 11, 1913.

No Drawing.  Application filed December 23, 1912. Serial No. 738,303.

*To all whom it may concern:*

Be it known that we, WILHELM HERZBERG and GERHARD HOPPE, citizens of the German Empire, residing, respectively at Wilmersdorf, near Berlin, Germany, and Treptow, near Berlin, Germany, our post-office addresses being, respectively, Prinzregentenstrasse 12ª, Wilmersdorf, near Berlin, Germany, and Defreggerstrasse 17, Treptow, near Berlin, Germany, have invented certain new and useful Improvements in Blue Dyes of the Anthraquinone Series, of which the following is a specification.

The present invention relates to the manufacture of new dyes which dye wool from an acid bath blue shades fast to light. These dyes are 1.4-diamino derivatives of anthraquinone-2-carboxylic acid and correspond to the general formula:

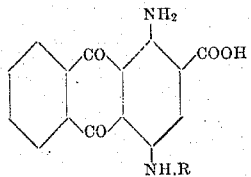

R meaning univalent radical. The solubility of these carboxylic acids may be augmented by introduction of sulfonic groups into the molecule.

The unsulfonated dyes are, generally speaking, dark compounds, difficultly soluble in water, but easily soluble with a blue color in alcohol, glacial acetic acid, hot nitro-benzene, alkalis. Their solution in sulfuric acid of 60% strength is brownish-red, in sulfuric acid of 100% strength brownish to olive, in oleum (*i. e.* fuming sulfuric acid) green-blue. They form brown-red sulfates, which are dissociated by water. They dye wool from a bath containing acetic acid blue.

The dyes containing sulfonic groups are blue powders, soluble with a blue color in water, alkalis, hot alcohol, glacial acetic acid. Their aqueous solution becomes red by addition of a great proportion of a mineral acid. They are dissolved by a mixture of oleum and boric acid, yielding blue solutions; sulfuric acid of 60% strength dissolves to red solutions. They dye wool from an acid bath blue.

The shades of the specified colorations depend to some extent upon the special constitution of the dyes, the blue being more or less greenish. The unsulfonated compounds are obtainable for instance by reacting with ammonia or a primary amin on 1-amino-4-halogen-anthraquinone-carboxylic acid. They are even formed by condensing 2-amino-5-acidylamino-4-carboxy-benzoyl-ortho-benzoic acid, 2.5-diaminobenzoyl-4-carboxy-benzoyl-ortho-benzoic acid or its lactam with dehydrating agents.

The introduction of sulfonic groups may be executed in any phase of the production of the dyes. If the condensation of the derivatives of benzoylbenzoic acid is performed by heating with sulfuric acid, it is possible to combine this operation with the sulfonation.

The following examples, the parts being by weight, illustrate how the dyes may be produced.

Example 1: 30 parts of 1-amino-4-chloro-anthraquinone-2-carboxylic acid are heated in an autoclave for 6 hours at 100° C. with 100 parts of ammonia (20%), 15 parts of calcined sodium carbonate and 1 part of crystallized cupric sulfate. From the blue solution the 1.4-diamino-anthraquinone-2-carboxylic acid is separated by an acid. Crystallized from alcohol it shows dark blue needles, melting at about 350° C. Its solution in alcohol, glacial acetic acid, hot nitrobenzene, alkalis is bright blue. Its sulfate crystallizes in brown-red needles.

Example 2: 30 parts of 1-amino-4-chloroanthraquinone-2-carboxylic acid are boiled for 20 hours in a reflux apparatus with 300 parts of water, 30 parts of 4-toluidin, 15 parts of calcined sodium carbonate and 1 part of crystallized cupric sulfate. By acidifying the blue solution the 1-amino-4-para-tolylaminoanthraquinone-2-carboxylic acid is separated. Recrystallized from nitrobenzene it is a dark crystal-powder with a violet reflex, melting at about 285° C. Its solution in alcohol, glacial acetic acid, hot nitrobenzene, alkalis is greenish-blue.

Example 3: 1 part of 2-amino-5-acetylamino-4-carboxy-benzoyl-ortho-benzoic acid, obtainable for instance from 2-nitro-5-acetylamino-4-methylbenzoyl-ortho-benzoic acid by oxidation with permanganate and reduction of the nitro group, is heated for a short time at 190° C. with 6 parts of sulfuric acid of 95% strength. On pouring the mass into ice-water the sulfate of the 1.4-diaminoanthraquinone-2-carboxylic acid separates in brownish-red needles. They are filtered and warmed with water, whereby the sulfate is hydrolyzed. The 1.4-diaminoanthraquinone-2-carboxylic acid remains in pure state.

Example 4: 1 part of the 2.5-diamino-4-carboxybenzoyl-ortho-benzoic acid or its lactam (obtained by heating 2-amino-5-acidylamino-4-carboxy-benzoyl-ortho-benzoic acid with sulfuric acid of 30% strength) is heated at 190° C. with a solution of 1 part of anhydrous boric acid in 6 parts of oleum containing 5% of $SO_3$. After a short time the temperature is lowered to 130-140° C. and 1 part of oleum containing 50% of $SO_3$ is added. After one hour the mass is poured into ice-water, whereupon the sulfate of the sulfonic acid separates. It dissolves easily in water to a blue solution, from which the 1.4-diaminoanthraquinone-sulfo-2-carboxylic acid is salted out.

Example 5: 1 part of 1.4-diaminoanthraquinone-2-carboxylic acid is heated at 130° C. with a mixture of 6 parts of oleum containing 20% $SO_3$ and 1 part boric acid, until a product is obtained, which is easily soluble in water. Then the mass is poured on ice and the dye salted out.

Example 6: 1 part of 1-amino-4-paratolylamino-anthraquinone-2-carboxylic acid is treated with oleum containing 10% $SO_3$ at 30-40° C., until the dye becomes easily soluble in water. From the diluted solution the dye is salted out.

What we claim is,—

1. As new products, the blue dyes being 1.4-diamino-derivatives of anthraquinone-2-carboxylic acid and having the general formula:

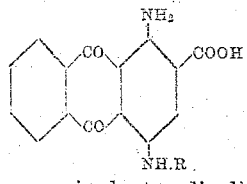

(R meaning a univalent radical), which are in the unsulfonated state, generally speaking, dark compounds, difficultly soluble in water, but easily soluble with a blue color in alcohol, glacial acetic acid, hot nitrobenzene, alkalis, soluble in sulfuric acid of 60% strength to a brownish-red, in sulfuric acid of 100% strength to a brownish to olive, in oleum to a green-blue solution, forming brown-red sulfates, which are dissociated by water; in the sulfonated state being, generally speaking, blue powders, soluble with a blue color in water, alkalis, hot alcohol, glacial acetic acid, the aqueous solutions becoming red by addition of a great proportion of a mineral acid; being dissolved from a mixture of oleum and boric acid to a blue solution, from sulfuric acid of 60% strength to a red solution; dyeing wool from an acid bath blue shades.

2. As a new product, the blue dye, in the unsulfonated state being the 1-amino-4-paratolylamino-anthraquinone-2-carboxylic acid:

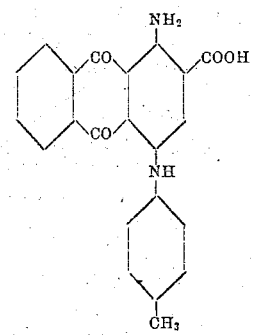

a dark powder with a violet reflex, difficultly soluble in water, but soluble with a blue color in alcohol, glacial acetic acid, hot nitrobenzene, alkalis; soluble in sulfuric acid of 60% strength to a brownish-red, in sulfuric acid of 100% strength to an olive, in oleum to a green-blue solution, forming a brown-red sulfate, which is dissociated by water; in the sulfonated state being a green-blue powder, soluble with a green-blue color in water, alkalis, hot alcohol, glacial acetic acid, the aqueous solutions, becoming red by addition of a great proportion of a mineral acid, being dissolved from a mixture of oleum and boric acid to a blue solution, from sulfuric acid of 60% strength to a red solution; dyeing wool from an acid bath greenish-blue shades.

In testimony whereof we have hereunto set our hands in presence of two subscribing witnesses.

WILHELM HERZBERG.
GERHARD HOPPE.

Witnesses:
 HENRY HASPER,
 WOLDEMAR HAUPT.